March 8, 1955

J. C. STIMSON 2,703,773

WELDED PLASTIC REFLECTOR UNITS
AND THE MANUFACTURE THEREOF

Filed Feb. 27, 1947

INVENTOR.
Jonathan Cass Stimson
BY
his Attorney

March 8, 1955    J. C. STIMSON    2,703,773
WELDED PLASTIC REFLECTOR UNITS
AND THE MANUFACTURE THEREOF Filed Feb. 27, 1947    3 Sheets-Sheet 2

INVENTOR.
Jonathan Cass Stimson
BY Jarvis C. Marble
his Attorney

United States Patent Office 2,703,773
Patented Mar. 8, 1955

2,703,773

WELDED PLASTIC REFLECTOR UNITS AND THE MANUFACTURE THEREOF

Jonathan C. Stimson, Evanston, Ill.; Viola H. Stimson, executrix of said Jonathan C. Stimson, deceased, assignor to Elastic Stop Nut Corporation of America, a corporation of New Jersey Application February 27, 1947, Serial No. 731,266

17 Claims. (Cl. 154—116)

The present invention relates to welded plastic articles and the manufacture thereof. More specifically the invention relates to articles comprising separately molded thermoplastic members welded together by fusion to form integral articles and still more particularly the invention relates to plastic lenses and the like, patricularly reflecting lenses, the optical or reflecting surfaces of which cannot be directly coated for protection but which require complete protection against deposits of foreign matter of all kinds if their effectiveness is to be maintained.

The invention is particularly adapted to and advantageous in the production of new and improved forms of plastic reflector units of the kind in which the reverse face of the reflecting member comprises a multiplicity of angularly related plane surfaces so arranged as to reflect back to its source a light beam impinging the reflector, and will therefore hereinafter be discussed and described by way of illustration but without limitation as applied to the production of such articles.

Reflectors of the kind under discussion, and particularly the kind disclosed in U. S. Patent No. 2,022,639 and commonly known under the trade name Stimsonite, have gone into wide spread commercial use but in order for such articles to maintain their original reflecting efficiency it is necessary that the optical or reflecting surfaces be kept absolutely clean, and this moreover cannot be accomplished by a coating applied directly to the optical surfaces without seriously impairing the efficacy of the reflector. As a consequence, reflector units of this kind have heretofore been made by attaching to the lens or face plate a backing plate of metal or other suitable material, the two plates providing a space or cavity between them and being joined around the marginal edges of the plates. For the assembly to be effective the cavity between the plates must be and remain hermetically sealed and heretofore such sealing has usually been attempted by some form of mechanical pressure joint utilizing a sealing gasket interposed between the parts. This however has proved to be unsatisfactory for the reason that the gasket mtaerials available sooner or later deteriorate to an extent causing the hermetic seal to be broken, or impair the effectiveness of the optical surfaces due to release of volatiles from the gasket material into the cavity between the members and subsequent condensation thereof on the surfaces under varying temperature conditions to which the unit may be subjected. In this connection it is to be noted that units of the kind under discussion are used most widely in out-of-doors locations, as for example highway delineators and warning signals, on vehicles and the like, where they are subjected to widely varying conditions of atmospheric temperature, pressure and humidity which often result in a substantial pressure differential between the cavity within the unit and the ambient atmosphere. When there is coupled with the requirement for a pressure tight seal the further requirement that the seal remain effective over a period of years without leakage and without deterioration of a kind resulting in deposits within the cavity, it can easily be understood that gasket material capable of meeting the requirements has not been developed.

In the absence of satisfactory gasket material, the production of a permanent hermetic seal between the parts of a unit by welding has been suggested but heretofore no form or method of producing a satisfactory welded unit of the kind under consideration has been developed. The primary reason for this is that the practical production of plastic pieces of the kind with which this invention is primarily concerned requires that they be formed by injection molding or equivalent operations involving heat and pressure, which operations produce articles having appreciable permanent internal strain which may be of substantial magnitude and which moreover is usually of a localized and unevenly distributed nature depending upon the shape of the article.

Welding operations as heretofore proposed are therefore unsuitable for sealing units comprising such pieces because of the distortion occasioned by release of internal strain resulting from the heat of the welding operation, which has in effect an annealing effect on the welded material.

The present invention has therefore as its primary object the production by a novel welding procedure of a new and improved form of welded plastic unit comprising parts fusion welded to provide a continuous and permanent hermetic seal between them so located and localized that appreciable distortion of the parts as a result of the welding operation is avoided. A more specific object of the invention is the production of units of the above described general character in which the welded parts comprise face and backing plates spaced to provide a cavity between them which is hermetically sealed by a localized peripherally continuous fusion weld between contacting marginal edge portions of the plates. A still more specific object is the production of such units in which the face plate comprises a lens of reflecting or other nature having optical surfaces on the cavity side of the plate. Other and still more specific objects of the invention, the manner in which they are attained and the advantages to be derived from practice of the invention will be pointed out more in detail in the ensuing portion of this specification, taken in conjunction with the accompanying drawings, in which a practical example of structure embodying the invention and the production thereof is described by way of illustrative example.

Figure 1:
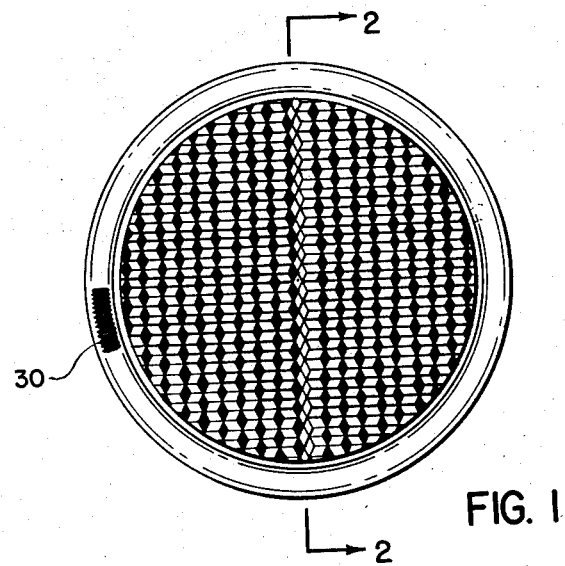
Fig. 1 is a top plan view of a lens unit embodying the invention.
Figure 2:
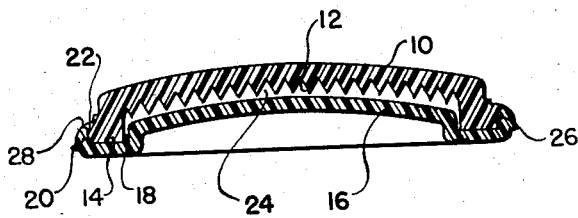
Fig. 2 is a section taken on the line 2—2 of Fig. 1.

Referring now particularly to Figs. 1 and 2 there is shown by way of example but without limitation a reflecting lens unit embodying the invention. The unit illustrated comprises a face or lens member indicated generally at 10 of thermoplastic material in the form of a circular convexly curved plate having on its reverse face a multiplicity of light reflecting surfaces 12 arranged in known manner to reflect light impinging the member in the direction back to its source. The central portion provided with these surfaces, which may conveniently be termed the lens area of the member, is encircled by a depending marginal rim portion 14. A backing member or plate 16 is provided with a marginal channel 18 in which the rim 14 of the face member is received, the outer wall of this channel being defined by an upstanding marginal flange 20 encircling the outer surface of the rim 14. Advantageously the backing member is made entirely of thermoplastic material but insofar as the present invention is concerned the essential consideration is that the marginal portion including particularly the flange 20 be of such material.

As will be observed from Fig. 2 the outer surface 22 of the rim 14 is slightly tapered and the flange 20 is shaped (in the manner hereinafter to be described) to engage this tapered surface to provide a seam 26 including a reentrant joint mechanically resisting separation of the parts. The face and backing plates are shaped to provide a cavity 24 behind the reflecting surfaces, and this cavity is hermetically sealed by fusion welding of the surfaces of the flange and rim adjacent to the exposed edge of the seam 26. As will hereinafter be more fully described this weld indicated at 28 is localized and in the embodiment illustrated is formed by displacement as well as fusion of material which results in transversely extending furrows and ridges which are indicated at 30 in Fig. 1. For convenience these ridges and furrows will hereinafter be referred to as corrugations, such term however being used in its broader sense since the specific shape and arrangement of the alternating projections and indentations at the surface may vary within the scope of the invention.

Figure 3:
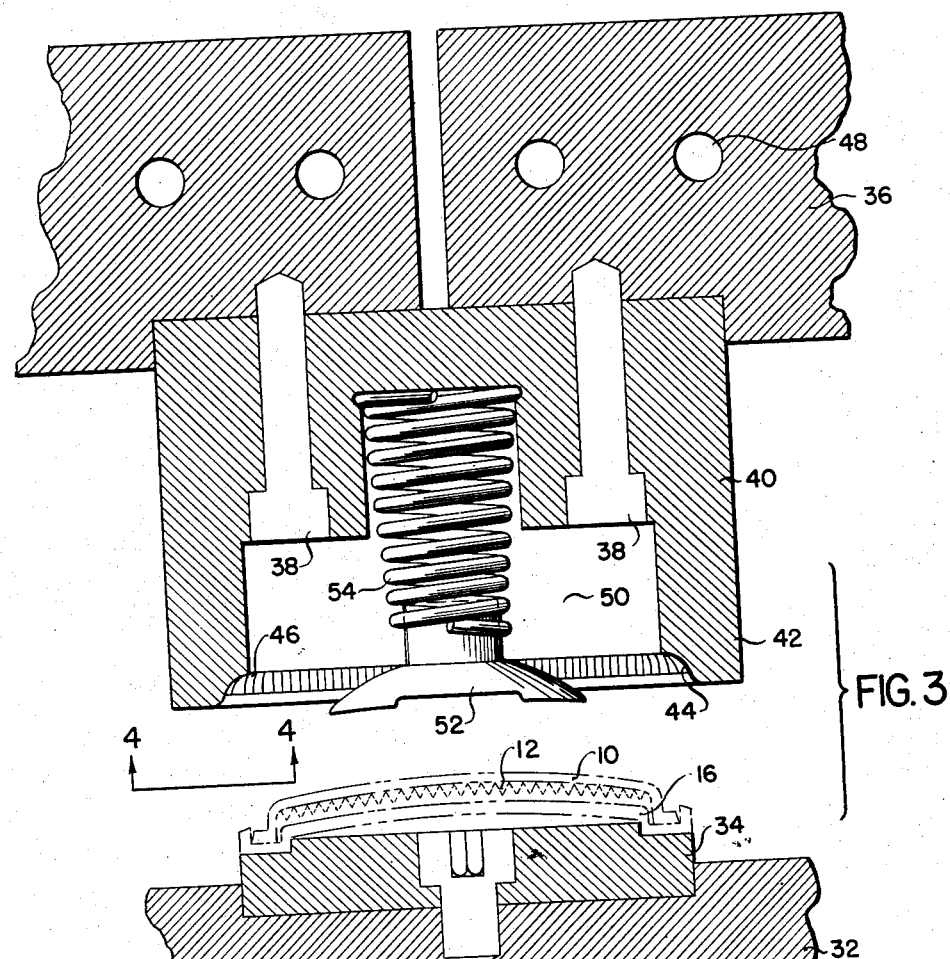
Fig. 3 is a sectional view showing apparatus suitable for carrying the invention into effect.
Figure 4:
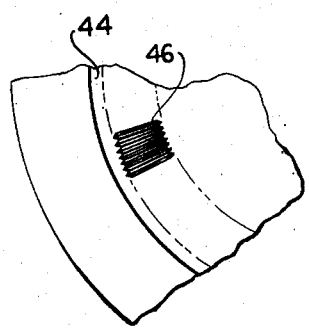
Fig. 4 is a fragmentary view on larger scale taken on the line 4—4 of Fig. 3.

Figs. 3 to 7 inclusive are illustrative of the manner in which the parts of the device are assembled and sealed in accordance with the invention. In Fig. 3, 32 indicates the bed of a hydraulic or other known form of press which carries a centering plate 34 for holding in centered position the backing plate 16 on which is laid the face or lens plate 10.

The plunger of the press is indicated at 36 and has secured thereto by studs 38 the forming or closing tool 40. Tool 40 has an annular wall 42 providing an internal annular working or forming face 44 which is of generally toric configuration. This surface is knurled to provide a series of radially extending serrations or corrugations 46 which as will be seen from Figs. 3 and 4 terminate short of the lower edge of the surface 44.

The tool 40 is heated so as to function as a welding as well as a forming tool and in the apparatus shown the tool is heated by conduction from the heated plunger 36 which in turn may be heated in any desired fashion. Advantageously as shown this member is heated by circulating steam through suitable heating channels 48. Alternatively electric resistance coils or other equivalent heating means may be employed.

Within the annular wall 42 of the tool a cavity 50 is provided for the reception of a stripping member 52 yieldably carried by spring 54 suitably secured to the tool.

Figure 5:
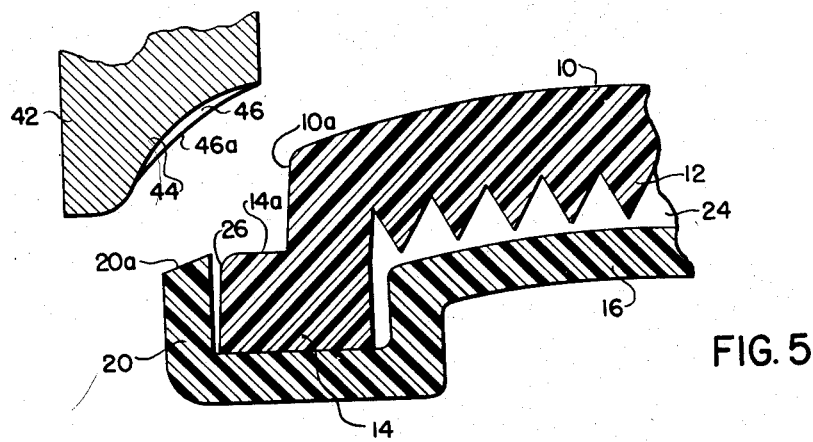
Figs. 5 to 7 are fragmentary views on enlarged scale showing different stages of the operation of the apparatus shown in Fig. 3.
Figure 6:
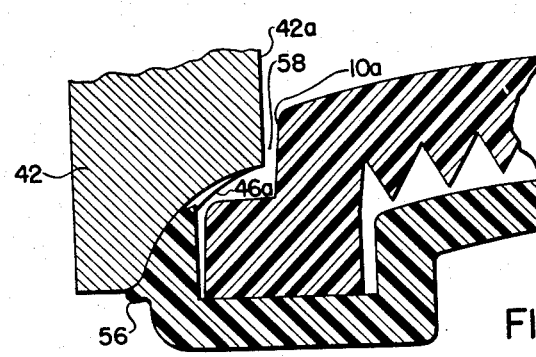
Figure 7:
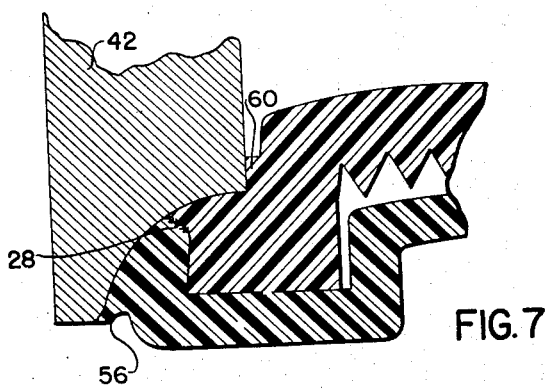

The action of the above described apparatus is shown more in detail in Figs. 5 to 7, Fig. 5 showing the position of the parts before the closing and welding operation takes place. As the heated forming tool descends the leading edges 46a of the knurled portion of the working face of the tool first make radial line contact at peripherally spaced places with the top surface 20a of flange 20, which surface as shown may advantageously be slightly beveled, and the top surface 14a of the rim 14. This initial contact produces lateral surface flow of the material contacted by the hot tool and freedom for such flow is provided by the radially extending channels in the corrugated or knurled surface of the tool. As the tool continues downwardly a certain amount of the displaced material flows outwardly to form a small peripheral flash indicated at 56 in Fig. 6, and due to the heating of the flange 20 and the lateral pressure exerted because of the toric form of the tool the flange is bent toward the tapered face 22 of the rim 14 to form the reentrant mechanical joint between the parts. As the tool moves to its final position shown in Fig. 7, the localized surface flow of the material from surfaces 14a and 20a fills the furrows of the corrugations in the tool and fuses together to form the localized continuous weld 28. During the latter part of the closing operation, after the tool comes into contact with surface 14a, freedom of lateral flow of this surface is advantageous and for this reason it is desirable to provide a clearance space 58 between the inner wall 42a of the tool and the outer wall 10a of the lens member 10. With such clearance provided a small amount of flash 60 may flow radially inwardly from the furrows or grooves during the welding operation.

As previously noted the difficulty heretofore encountered in attempting to weld articles of the kind under consideration has been due to distortion of the parts because of the annealing effect of heat conducted from the place where the weld is effected.

In accordance with the procedure just described this is avoided by forming a continuous fusion seal or weld between the parts which at the same time is highly localized and can be effected without application of heat of sufficient intensity or long enough duration to cause conduction sufficient to result in annealing action on the portions of the parts relatively close to the actual line of weld.

To accomplish the desired results, however, even with the described process certain procedures should be followed, and by way of example but without limitation the following data are indicative of preferred procedure. The surface temperature for the tool should correspond closely to the proper temperature for a compression type mold used to mold an article from the same powdered raw material. For articles of methyl-methacrylate tool temperatures between 300–325° F. have been found suitable. For articles of polystyrene temperatures of 270–290° F. have been used successfully. The unit pressure required is comparatively light. Pressures of 100–300 pounds per square inch of surface in contact with the knurled portion of the tool are suitable, but even lighter pressures may be found to be adequate provided the press employed permits of sufficiently accurate pressure control in a low pressure range. The speed of penetration of the tool is important and speeds ranging from 0.175 inch per minute to 0.250 inch per minute have been employed successfully. It will be understood that the specific speed employed will depend upon the size of the article being welded and the depth and size of the knurl. The time of contact of the tool with the material being welded will also vary with the size of article being welded, speed of penetration, etc., but in practice times of from 7 to 40 seconds have been found sufficient to produce the desired weld. For articles ranging in size from a diameter of approximately 1 or 1½ inches up to 7 or 8 inches, a tool knurled to provide from 20 to 40 corrugations or teeth per inch and having a depth of tooth ranging from approximately one to two one hundredths of an inch has been found satisfactory and operations with such tools and with temperatures, pressures, and speeds of operation within the range noted above have resulted in substantially 100% perfect continuous welds which are of the order of one one hundredth of an inch deep and which follow along the contour of the serrations. From this it will be seen that the weld produced is very highly localized in its nature and because of the localized application of heat for a comparatively short time and at moderate temperature, conduction of heat to parts of the structure even closely adjacent to the weld is limited to a degree avoiding any annealing action on such parts.

As previously noted any suitable known form of press apparatus may be employed which is capable of giving a controlled stroke at predetermined speed. Since such apparatus and means for controlling it are well known it is not believed necessary that it be described herein in detail. Ordinarily however, since the actual closing operation is carried out at comparatively very slow plunger speed, it is desirable to provide in the usual known manner for a quick acting preliminary stroke and a quick acting return stroke for opening the press to permit insertion and removal of the work pieces, coupled with the controlled slow final closing stroke. In some instances it may be desirable to provide for a slight period of dwell at the end of the closing stroke after full penetration has been effected and if such dwell is provided in the cycle, it is of relatively very short duration of the order of only a few seconds.

It will be noted from an inspection of Figs. 5 to 7 inclusive that the rim 14 provides a tapered outer surface extending in a generally axial direction and a surface 14a extending laterally from the tapered surface. Flange 20 provides an inner surface extending in a generally axial direction and opposed to the tapered surface and a surface 20a extending laterally from the axially extending surface. In forming the seal between the members 10 and 16 heat and pressure are applied to the surfaces 14a and 20a to fuse the exposed edges of the tapered surface and the axially extending surface on the flange 20, the resulting seal being illustrated in Fig. 7. This method of applying the heat and pressure is contrary to the usually accepted practice in which the heat and pressure would be applied in such a manner as to bring the confronting surfaces to be sealed together, in which case pressure would be applied radially of the members 10 and 16 rather than axially thereof as in the instant invention. The result of applying the heat and pressure across the exposed edges of the seam is to provide a seal in which the heat penetrates to a limited depth causing the material to flow and form a fusion weld, and consequently distortion of the members 10 and 16 due to expansion and contraction is prevented, whereas if heat and pressure were applied over a relatively wide area the penetration of the heat would be such that distortion would result.

While for purposes of explaining and illustrating the nature of the invention I have shown but one form of welded unit, it will be apparent that the invention is applicable to a wide variety of different specific units including other forms of optical units, wherein the optical surfaces may be on the forward face of the backing member with the face plate or member acting merely as a protective shield for forming the sealed cavity or having optical surfaces in addition to optical surfaces on the backing member.

Consequently, the scope of the invention is to be understood as including all articles and methods and means for forming them embraced within the scope of the appended claims.

What is claimed is:

1. An article comprising a first member having a rim of thermoplastic material and a second member having a flange of thermoplastic material encircling said rim and engaging the outer perimeter of said rim to form a seam providing a reentrant joint for mechanically resisting separation of said members, the surface edge of the seam between said rim and said flange being fusion welded to provide a hermetic seal between said members and optic surfaces on the inner face of at least one of said members.

2. An article as set forth in claim 1, in which the weld is localized to the surface edge portion of the seal.

3. An article comprising a face plate having a marginal portion providing a depending rim of thermoplastic material and a backing plate having a marginal portion providing a channel for receiving said rim, the outer wall of said channel being formed by a flange of thermoplastic material, the outer surface of said rim and the inner surface of said flange providing reentrant engaging surfaces for holding the plates together and the top surface portions of said flange and said rim being fusion welded together to hermetically seal the seam formed between said engaging surface and optic surfaces on the inner face of at least one of said members.

4. An article as set forth in claim 3, in which the fusion weld is localized to substantially the surface portion of the welded parts.

5. An article comprising two members having portions of thermoplastic material engaging to provide a perimetrally continuous seam between the members, the edge surface portions along the seam being formed into alternating projections and indentations and said surface portions being fusion welded together to hermetically seal the seam and optic surfaces on the inner face of at least one of said members, said projections and indentations forming a series of closely spaced teeth extending transversely of the seam and the weld being substantially localized in depth to the surface portion comprised by said teeth.

6. A plastic optic unit comprising two plates of thermoplastic material having engaging marginal portions providing a perimetrally continuous seam and forming a cavity between the plates, at least one of said plates having optic surfaces on the cavity side of the plate providing a lens area extending to a place closely adjacent to the engaging marginal portion of the plate, said marginal portions being fusion welded along the surface edge of the seam to hermetically seal the cavity and said weld being localized substantially to the surface portion of the parts along the seam.

7. The method of hermetically sealing two members of thermoplastic material, one of which is provided with a perimetral rim having a tapered surface and the other of which is provided with a flange adjacent to said surface, which comprises applying heat and lateral pressure to the flange to bring it into engagement with said tapered surface to provide a reentrant joint for mechanically preventing separation of the parts and applying heat and pressure to the edge surfaces of the members defining between them the seam at spaced places along the line of the seam to fusion weld said surfaces along the surface edge portion of the seam.

8. In the manufacture of a unit of the kind having a face plate of thermoplastic material provided with an optic surface area and a perimetral rim around and adjacent to said area and a backing plate of thermoplastic material capable of being fused by heat wih the material of the face plate for covering said area and having a rim adapted to engage the rim of the face plate, the steps which include placing the rims of said plates together to present a peripheral marginal seam between contiguous edge surfaces of the plates extending laterally away from the seam, and hermetically sealing said seam by simultaneously applying heat and pressure to said edge surfaces at closely spaced intervals along said seam to create flow of the material at said surfaces to seal the seam.

9. A method as set forth in claim 8 in which the heat and pressure is initially applied to said surfaces along lines extending transversely of the seam.

10. A method as set forth in claim 8, in which the heat and pressure is applied by means of a hot tool transversely corrugated with respect to the line of the seam, said tool being moved relatively slowly against said surfaces, whereby to obtain an initial flow of the surface material at the lines of the crests of the corrugations and a subsequent flow of the material lengthwise of the seam into the hollows of the corrugations upon further movement of the tool to thereby seal the seam along its entire length by fused material.

11. The method as set forth in claim 10 in which excess surface material is permitted to flow lengthwise of said corrugations beyond the boundary of at least one of said edge surfaces.

12. The method of hermetically sealing together two bodies of thermoplastic material having two confronting surfaces providing between them a seam and adjacent faces extending laterally away from the exposed edge of said seam, which includes the step of applying heat and pressure to said faces at spaced places along said edge of the seam to create surface flow and fusion of the material of said faces to seal the exposed edge portion of the seam.

13. The method of hermetically sealing together two bodies of thermoplastic material having two confronting surfaces providing between them a seam and adjacent faces extending laterally away from the exposed edge of said seam, which includes the step of applying heat and pressure in the general direction of said confronting surfaces to said faces at spaced places along the exposed edge of the seam to create surface flow and fusion of the material at said faces to seal the exposed edge of the seam.

14. The method of hermetically sealing together two bodies of thermoplastic material having two confronting surfaces providing between them a seam and adjacent faces extending laterally away from the exposed edge of said seam, which includes the steps of applying heat and pressure in the general direction of said confronting surfaces to said faces at spaced places along the exposed edge of the seam to create surface flow and fusion of the material at said faces to seal the exposed edge of the seam, and limiting the duration of application of said heat and pressure to limit the fusion of the material to the zone immediately adjacent to said faces.

15. The method of hermetically sealing together two bodies of thermoplastic material having two confronting surfaces providing between them a seam and adjacent faces extending laterally away from the exposed edge of said seam, which includes the step of applying heat and pressure in the general direction of said confronting surfaces to said faces along spaced lines extending transversely across the exposed edge of the seam to create surface flow and fusion of the material at said faces to seal the exposed edge of the seam.

16. The method of hermetically sealing together two bodies of thermoplastic material having two confronting surfaces providing between them a seam and adjacent faces extending laterally away from the exposed edge of said seam, which includes the step of applying heat and pressure in the general direction of said confronting surfaces to said faces at spaced places along the exposed edge of the seam to create surface flow of the material at said of the seam to create surface flow of the material in the spaces between the faces transversely of the seam in the spaces between the places of application of said heat and pressure to seal the exposed edge of said seam by fusion of the material.

17. The method of hermetically sealing together two bodies of thermoplastic material having two confronting surfaces providing between them a seam and adjacent faces extending laterally away from the exposed edge of said seam, which includes the steps of applying heat and pressure to said faces in the general direction of said confronting surfaces at spaced places along the exposed edge of the seam to form said faces by fusion into a continuous corrugated surface portion having corrugations extending transversely across the line of the seam and sealing the exposed edge portion thereof, and limiting the application of said heat and pressure to confine the fusion between the parts substantially to the depth of the corrugated surface portion thereof.

References Cited in the file of this patent

UNITED STATES PATENTS

| Number | Name | Date |
|---|---|---|
| 1,767,285 | Higbie | June 24, 1930 |
| 2,214,030 | Pereles | Sept. 10, 1940 |
| 2,220,545 | Reinhardt | Nov. 5, 1940 |
| 2,286,085 | Haggart, Jr. | June 9, 1942 |
| 2,289,618 | Young | July 14, 1942 |
| 2,322,298 | Johnston | June 22, 1943 |
| 2,337,167 | Patton | Dec. 21, 1943 |
| 2,335,070 | Luhrs | Nov. 23, 1943 |
| 2,340,510 | Corley | Feb. 1, 1944 |
| 2,341,467 | Nedell | Feb. 8, 1944 |
| 2,367,067 | Spieth | Jan. 9, 1945 |
| 2,379,500 | Steffens | July 3, 1945 |
| 2,388,297 | Slaughter | Nov. 6, 1945 |
| 2,389,560 | Steffens | Nov. 20, 1945 |
| 2,390,550 | Moore | Dec. 11, 1945 |
| 2,421,277 | Luce | May 27, 1947 |
| 2,425,388 | Oestricher | Aug. 12, 1947 |